United States Patent [19]

Komoda

[11] Patent Number: 4,917,208

[45] Date of Patent: Apr. 17, 1990

[54] ENGINE BRAKE CONTROL DEVICE

[75] Inventor: Takao Komoda, Okazaki, Japan

[73] Assignee: Toyota Jidosha Kabushiki Kaisha, Aichi, Japan

[21] Appl. No.: 243,593

[22] Filed: Sep. 12, 1988

[30] Foreign Application Priority Data

Sep. 29, 1987 [JP] Japan ................ 62-242736

[51] Int. Cl.$^4$ ............................................. B60K 15/00
[52] U.S. Cl. .................................... 180/197; 123/333; 180/284; 364/426.03
[58] Field of Search ...................... 180/197, 271, 54.1, 180/284; 123/334, 335, 333; 364/426.03; 303/103

[56] References Cited

U.S. PATENT DOCUMENTS

| | | | |
|---|---|---|---|
| 3,802,528 | 9/1974 | Leiber | 180/271 |
| 4,739,856 | 4/1988 | Inagaki et al. | 180/197 |
| 4,771,849 | 9/1988 | Leiber et al. | 180/197 |
| 4,788,644 | 11/1988 | Inagaki | 364/426.03 |
| 4,825,367 | 4/1989 | Nagaoka et al. | 364/426.03 X |

FOREIGN PATENT DOCUMENTS 56-23480 2/1981 Japan .
59-138750 9/1984 Japan .

Primary Examiner—Mitchell J. Hill
Attorney, Agent, or Firm—Kenyon & Kenyon

[57] ABSTRACT

An engine brake control device comprising a fuel cutting unit, slippage detecting unit, and a control unit, whereby, when an engine braking operation is underway, the fuel cutting unit stops the supply of fuel to the engine, but if a slippage of the driven wheels of the vehicle is detected by the slippage detecting unit, while the fuel cutting operation is being executed by the fuel supply cutting unit, the control unit prohibits the operation of the fuel supply cutting unit, and therefore, when a slippage of the driven wheels is caused by an engine braking operation, fuel is fed into the engine and the slippage of the driven wheel is prevented.

7 Claims, 3 Drawing Sheets

ENGINE BRAKE CONTROL DEVICE

BACKGROUND OF THE INVENTION

1. Field of the Invention

The present invention relates to an engine brake control device by which a loss of traction (hereinafter referred to as slippage) by a driven wheel is prevented during a reduction of a vehicle speed.

2. Description of the Related Art

A known engine brake control device comprises a vehicle speed detecting means for detecting the vehicle speed, an engine speed detecting means for detecting the engine speed, and a control means for feeding air into the engine when it is determined that slippage of a driven wheel has occurred during a reduction of a vehicle speed. Slippage of the driven wheel is considered to have occurred when it is determined that the engine speed detected by the engine speed detecting means is lower than a speed corresponding to the vehicle speed detected by the vehicle speed detecting means.

This engine brake control device is used to reduce an excessive engine braking force, and thus prevent slippage of the driven wheel, by feeding air into the engine when slippage of the driven wheel is caused by an excessive engine brake force produced, for example, by a rapid shift from a high gear to a low gear (refer to Japanese Unexamined Patent Publication No. 59-138750).

U.S. Pat. No. 3,802,528 discloses an arrangement for an automatic torque control, by which the degree of opening of the throttle valve is increased when such slippage occurs.

Generally, a fuel supply to the engine is stopped during a reduction of the vehicle speed, i.e., when the engine speed is higher than a predetermined value and the throttle valve is closed, so that a discharge of unburnt components of an exhausted gas is prevented and the fuel consumption is reduced.

In an engine provided with this prior art engine brake control device, air is fed into the engine when a slippage of the driven wheel occurs during a reduction of the vehicle speed. Nevertheless, when an excessive engine braking force is produced, for example, due to a rapid shift from a high to a low gear, the engine brake force can not be sufficiently reduced by only feeding air into the engine, and therefore, slippage of the driven wheel may still occur when the above prior art device is used.

SUMMARY OF THE INVENTION

An object of the present invention is to provide an engine brake control device capable of preventing a slippage of a driven wheel of a vehicle at the first sign of a loss of traction by cancelling the fuel cut operation and supplying fuel to the engine.

According to the present invention, there is provided an engine brake control device for a vehicle having a driven wheel and a non-driven wheel, the device comprising: a fuel supply means for feeding fuel into an engine; a first determining means for determining whether an engine brake operation is underway; a fuel supply cutting means for stopping a supply of fuel to the engine by the fuel supply means, in response to a determination by the first determining means that an engine brake operation is underway; a second determining means for determining whether a slippage of the driven wheel of the vehicle has occurred; and control means for prohibiting the operation of the fuel supply cutting means and allowing fuel to be supplied to the engine in response to a determination by the second determining means that a slippage of the driven wheel of the vehicle has occurred.

The present invention may be more fully understood from the description of preferred embodiment of the invention set forth below, together with the accompanying drawings.

DESCRIPTION OF THE PREFERRED EMBODIMENTS

Figure 1:
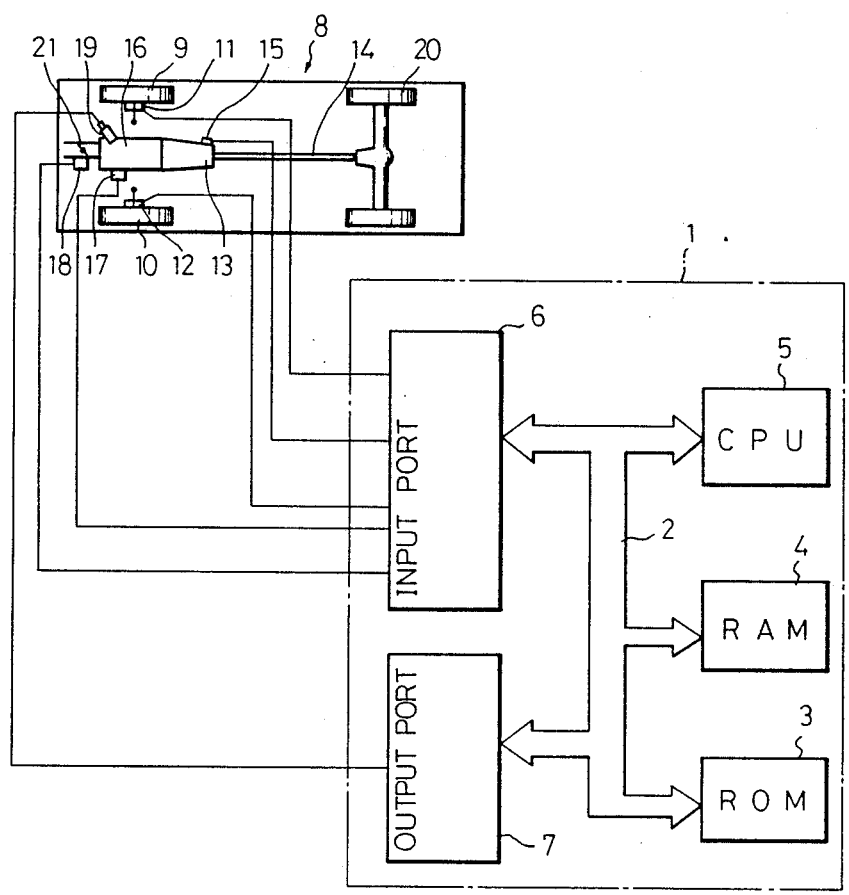
FIG. 1 is a schematic diagram of a vehicle to which the present invention is applied.

Referring to FIG. 1, reference numeral 1 designates an electronic control unit. The electronic control unit 1 is constructed as a digital computer and comprises a ROM (read only memory) 3, a RAM (random access memory) 4, a CPU (microprocessor, etc.) 5, an input port 6, and an output port 7. The ROM 3, the RAM 4, the CPU 5, the input port 6, and the output port 7 are interconnected via a bidirectional bus 2.

A right front (RF) wheel 9 and a left front (LF) wheel 10 of a vehicle are non-driven wheels, and an RF wheel speed sensor 11 for detecting a speed of rotation of the RF wheel 9 and an LF wheel speed sensor 12 for detecting a speed rotation of the LF wheel 10 are mounted at the RF wheel 9 and LF wheel 10, respectively. The signals output by these wheel speed sensors 11 and 12 are input to the input port 6.

An output shaft speed sensor 15 is attached to a transmission 13, and is used to detect a speed of rotation of the output shaft 14 which corresponds to the speed of rotation of the driven wheels 20. The signals output by the output shaft speed sensor 15 are also input to the input port 6. Further, an engine speed sensor 17 for detecting an engine speed is mounted to the engine, and a degree of opening detecting sensor 18 for detecting a degree of opening of a throttle valve 21 is mounted to the throttle valve 21. The signals output by these sensors 17 and 18 are input to the input port 6. Note, the output port 7 is connected to a fuel injector 19.

The operation of this embodiment will be now explained.

When an accelerator pedal is released, the throttle valve 21 is closed and a signal is input to the input port 6. At this time, the engine speed $N_E$ is detected by an engine speed sensor 17, and a signal is output thereby to the input port 6. In the CPU 5, the engine speed $N_E$ is compared with a predetermined fuel cut speed $N_C$ stored in the ROM 3. When the throttle value 21 is closed and $N_E \geq N_C$, a signal for stopping a supply of fuel to the engine (hereinafter referred to as a fuel cut) is output from the output port 7 to the fuel injector 19, and the fuel supply to the engine is stopped, i.e., a fuel cut operation is executed. Therefore, a discharge of unburnt components in the exhausted gas is prevented, the fuel consumption is reduced and a strong engine braking effect is produced. When the engine braking operation is carried out, slippage of the driven wheels 20 may occur if the vehicle is running on a low friction surface road, for example, on a road covered with ice and snow. Slippage of the driven wheels 20 is determined by comparing the speed of rotation of the driven wheels 20 with the speed of rotation of the non-driven wheels 9 and 10. Namely, slippage of the driven wheels 20 is determined when the following equation is satisfied:

$$N_R \times A < \frac{N_{FR} + N_{FL}}{2} - B$$

where:
$N_R$: a speed of rotation of the output shaft
$N_{FR}$: a speed of rotation of the RF wheel
$N_{FL}$: a speed of rotation of the LF wheel
A: a coefficient for conversion of $N_R$ to a speed of rotation of a driven wheel
B: a coefficient for cancelling an error in measurement and a difference between the speed of rotation of the RF wheel and the speed of rotation of the LF wheel when the vehicle is turning.

Slippage of the driven wheels 20 is determined by the CPU 5. Namely, each speed $N_R$, $N_{FR}$, and $N_{FL}$ is detected by the output shaft speed sensor 15, the RF wheel speed sensor 11, and the LF wheel speed sensor 12, respectively, and the signals output from these sensors 11, 12, and 15 are input to the input port 6. The RF wheel speed sensor 11, LF wheel speed sensor 12, shaft speedsensor 15, and the CPU 5 thus comprise a second determining means for determining whether or not a slippage of a driven wheel of the vehicle has occurred.

If slippage is determined, a signal prohibiting a fuel cut is output from the output port 7 to the fuel injector 19, and fuel is supplied to the engine, and therefore, the engine braking effect is reduced and a slippage of the driven wheels 20 is avoided.

Figure 2:
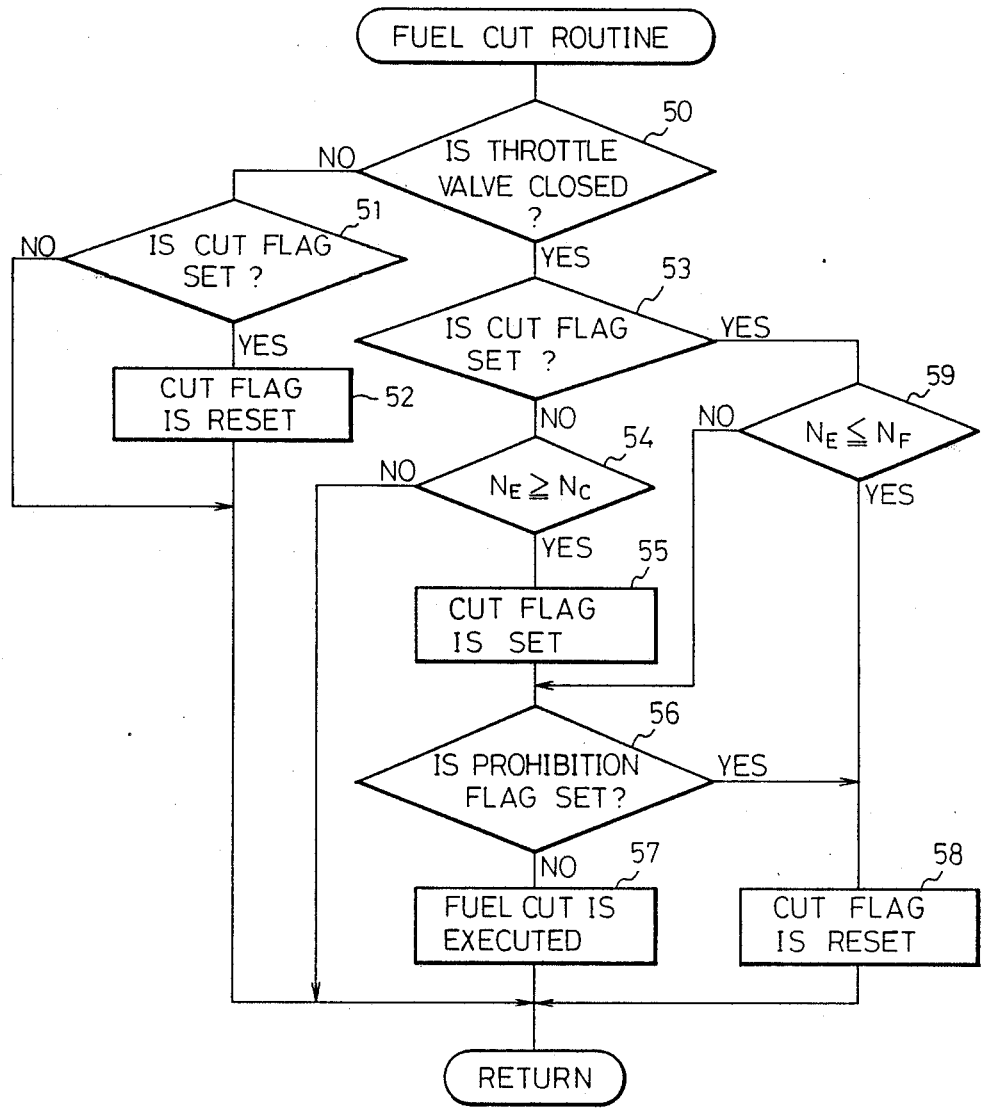
FIG. 2 is a flow chart of the execution of the process of cutting a supply of fuel to the engine.

FIG. 2 is a flow chart of the execution of the fuel cut process when reducing the vehicle speed.

Referring to FIG. 2, in step 50, it is determined whether or not the throttle valve 21 is closed. If the throttle valve 21 is not closed, i.e. is open the routine goes to step 51, and it is determined whether or not the cut flag (i.e., the signal for stopping the supply of fuel to the engine) is set. If the cut flag is not set, the processing cycle is completed, but if the cut flag is set, the routine goes to step 52 and the cut flag is reset.

When it is determined in step 50 that the throttle valve 21 is closed, the routine goes to step 53 and it is determined whether or not the cut flag is set. If the cut flag is not set, the routine goes to step 54 and it is determined whether or not the engine speed $N_E$ is equal to or larger than the fuel cut speed $N_C$. If $N_E < N_C$, the processing cycle is completed. In this case, the signal for stopping the fuel supply is not output to the fuel supply controlling means, and therefore, the fuel cut operation is not executed, but if $N_E \geq N_C$, the routine goes to step 55 and the cut flag is set. The routine then goes to step 56, where it is determined whether or not the fuel cut prohibition flag (hereinafter referred to as the prohibition flag) is set. If the prohibition flag is not set, the cut flag is maintained in the set state and the routine goes to step 57, where a signal for stopping the fuel supply is output, and therefore, a fuel cut operation is executed. When it is determined in step 56 that the prohibition flag is set, the routine goes to step 58 and the cut flag is reset, and therefore, the signal for stopping the fuel supply is not output.

When it is determined in step 53 that the cut flag is set, the routine goes to step 59 and it is determined whether or not the engine speed $N_E$ is equal to or smaller than a predetermined fuel feed speed $N_F$ stored in the ROM 3. If $N_3 \leq N_F$, the routine goes to step 58 and the cut flag is reset, and therefore, the signal for stopping the fuel supply is not output. If $N_E > N_F$ in step 59, the routine goes to step 56 and it is determined whether or not the prohibition flag is set. If the prohibition flag is not set, the cut flag is maintained in the set state and the routine goes to step 57.

In step 57, the signal for stopping the fuel supply is output, and therefore, the fuel cut operation is executed. When it is determined in step 56 that the prohibition flag is set, the routine goes to step 58 and the cut flag is reset, and therefore, the signal for stopping the fuel supply is not output.

Figure 3:
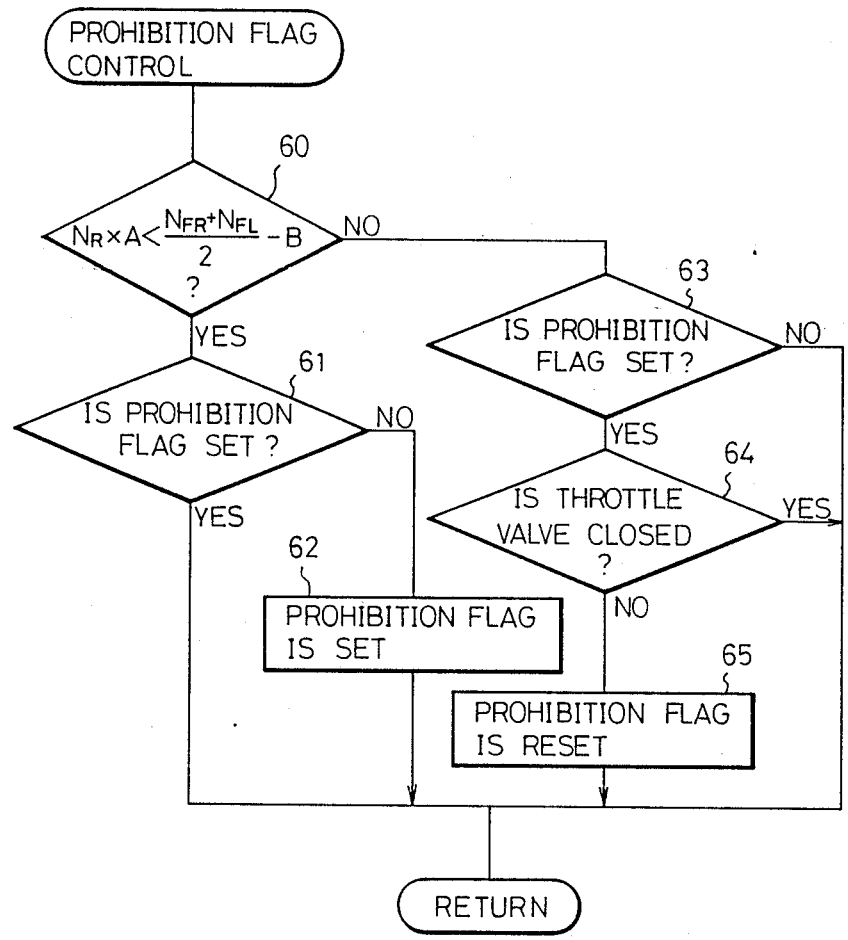
FIG. 3 is a flow chart of the execution of the control of the operation of the prohibition flag for prohibiting a cut of the fuel supply to the engine.

FIG. 3 is a flow chart of the execution of the control of the operation of the prohibition flag.

Referring to FIG. 3, in step 60 it is determined whether or not slippage has occurred at the driven wheels 20, by comparing the speed of rotation of the driven wheels 20 with speed of rotation of the non-driven wheels 9 and 10.

If $$N_R \times A < \frac{N_{FR} + N_{FL}}{2} - B,$$

i.e., slippage has occurred at the driven wheels 20, the routine goes to step 61 and it is determined whether or not the prohibition flag is set.

If the prohibition flag is set, the processing cycle is completed, but if the prohibition flag is not set, the routine goes to step 62 and the prohibition flag is set. Therefore, in the fuel cut routine (FIG. 2), the fuel cut operation is prohibited and fuel is supplied to the engine. When it is determined in step 60 that slippage of the driven wheels 20 has not occurred, the routine goes to step 63 and it is determined whether or not the prohibition flag is set. If the prohibition flag is not set, the processing cycle is completed, and therefore, the fuel cut operation is not prohibited. But, if the prohibition flag is set, the routine goes to step 64, where it is determined whether or not the throttle valve 21 is closed. If the throttle valve 21 is closed, the prohibition flag is maintained in the set state, and therefore, the fuel cut operation is prohibited and fuel is supplied to the engine. When it is determined in step 64 that the throttle valve 21 is not closed, the routine goes to step 65 and the prohibition flag is reset. In step 64, once slippage of the driven wheels 20 is determined, the prohibition flag is maintained in the set stage until the throttle valve 21 is again opened, i.e., until the accelerater pedal is operated, and therefore, a frequent repetition of alternate fuel feed and fuel cut operations is prevented.

Although the invention has been described with reference to a specific embodiment chosen for the purpose of illustration, it should be apparent that numerous modifications can be made thereto by those skilled in the art without departing from the basic concept and scope of the invention.

I claim:

1. An engine brake control device for a vehicle having a non-driven wheel and a driven wheel driven by an engine having a throttle valve, the brake control device comprising:

fuel supply means for supplying fuel to the engine;

a degree of opening detection sensor for detecting a degree of opening of said throttle valve;

an engine speed sensor for detecting an engine speed;

a fuel supply controlling means, responsive to an output signal of said degree of opening detecting sensor and an output signal of said engine speed sensor, for stopping a supply of fuel to the engine when the engine speed is higher than a predetermined speed at which a fuel supply is to be stopped when said throttle valve is closed;

first means for detecting a speed of rotation of said driven wheel;

second means for detecting a speed of rotation of said non-driven wheel;

control means for controlling said fuel supply controlling means in response to an output signal of said first means and an output signal of said second means to prohibit a fuel supply stopping operation by said fuel supply controlling means and allow fuel to be supplied to the engine when said speed of rotation of said driven wheel is lower than said speed of rotation of said non-driven wheel.

2. An engine brake control device according to claim 1, wherein said fuel supply means comprises a fuel injector.

3. An engine brake control device according to claim 1, wherein said fuel supply controlling means stops said fuel supply stopping operation and allows fuel to be supplied to the engine when the engine speed becomes lower than a predetermined speed at which a fuel supply is to be started.

4. An engine brake control device according to claim 1, wherein said control means stops a prohibition of said fuel supply stopping operation in response to output signals of said first means, second means and said degree of opening detecting sensor when said speed of rotation of said driven wheel becomes equal to or higher than said speed of rotation of said non-driven wheel and said throttle valve is opened.

5. An engine brake control device according to claim 1, wherein said engine is provided with a transmission having an output shaft, the output shaft being connected to the driven wheel and rotating at a speed directly related to the speed of the driven wheel, and said first means detects said speed of rotation of said driven wheel from a speed of rotation of said output shaft.

6. An engine brake control device according to claim 1, wherein said vehicle has two non-driven wheels, and said second means comprises two wheel speed sensors for detecting the rotational speed of the non-driven wheels.

7. An engine brake control device according to claim 6, wherein said second means detects the rotational speed of the non-driven wheel by determining a mean value of the speeds of the two non-driven wheels.

* * * * *

UNITED STATES PATENT AND TRADEMARK OFFICE
CERTIFICATE OF CORRECTION

PATENT NO. : 4,917,208
DATED : 17 April 1990
INVENTOR(S) : Takao KOMODA It is certified that error appears in the above-identified patent and that said Letters Patent is hereby corrected as shown below:

| Column | Line | | |
|--------|------|---|---|
| 2 | 59 | Change "value" to --valve--. | |
| 3 | 29 | Delete "The RF". | |
| 3 | 30-33 | Delete entirely. | |
| 4 | 7 | Change "$N_3$" to --$N_E$--. | |

Signed and Sealed this

Third Day of September, 1991

Attest:

HARRY F. MANBECK, JR.

Attesting Officer

Commissioner of Patents and Trademarks